Oct. 27, 1931.   A. A. HILL   1,829,652
ATTACHMENT FOR TRUCKS
Filed Dec. 1, 1930   2 Sheets-Sheet 2
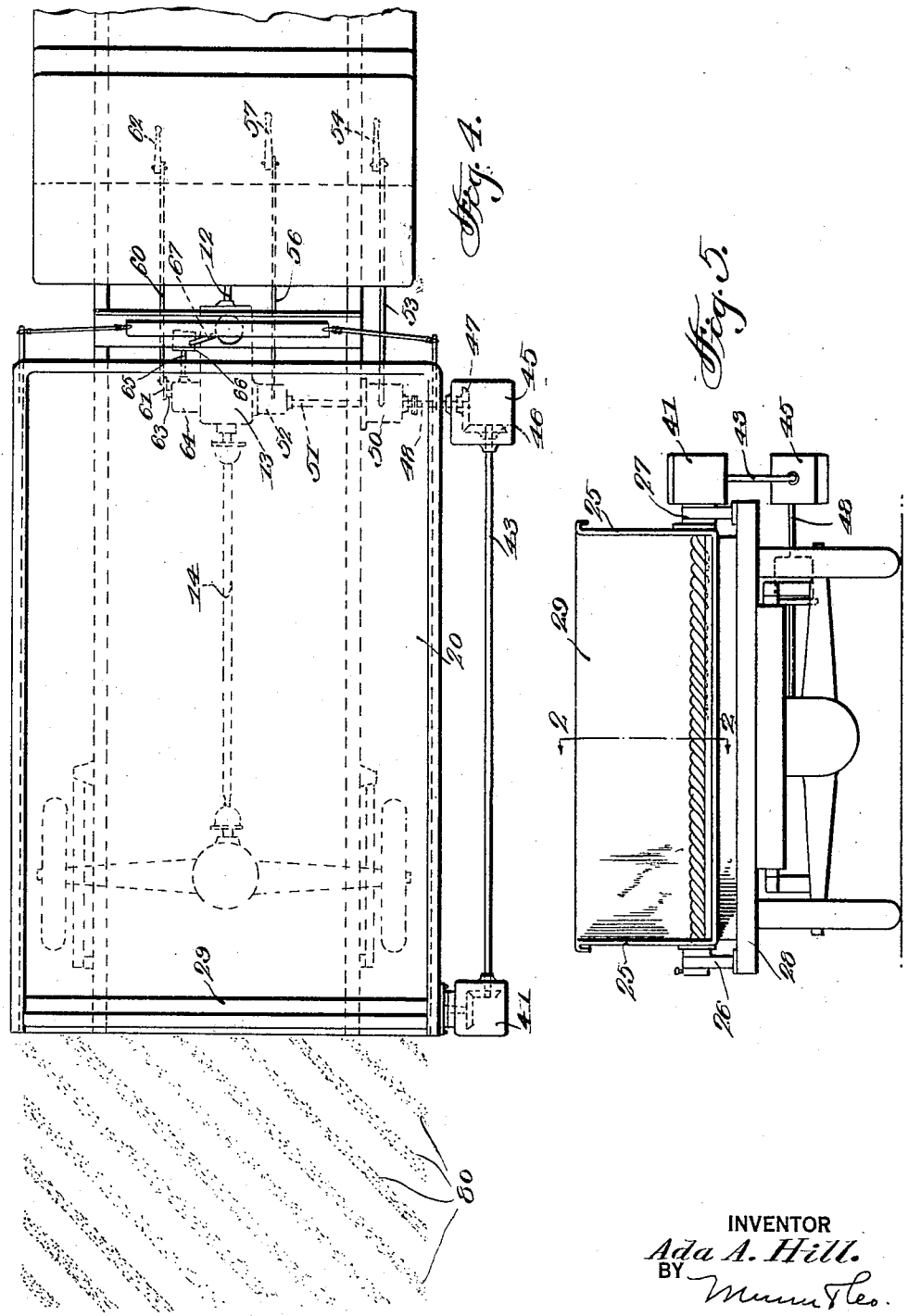
INVENTOR
Ada A. Hill.
BY
ATTORNEY Patented Oct. 27, 1931

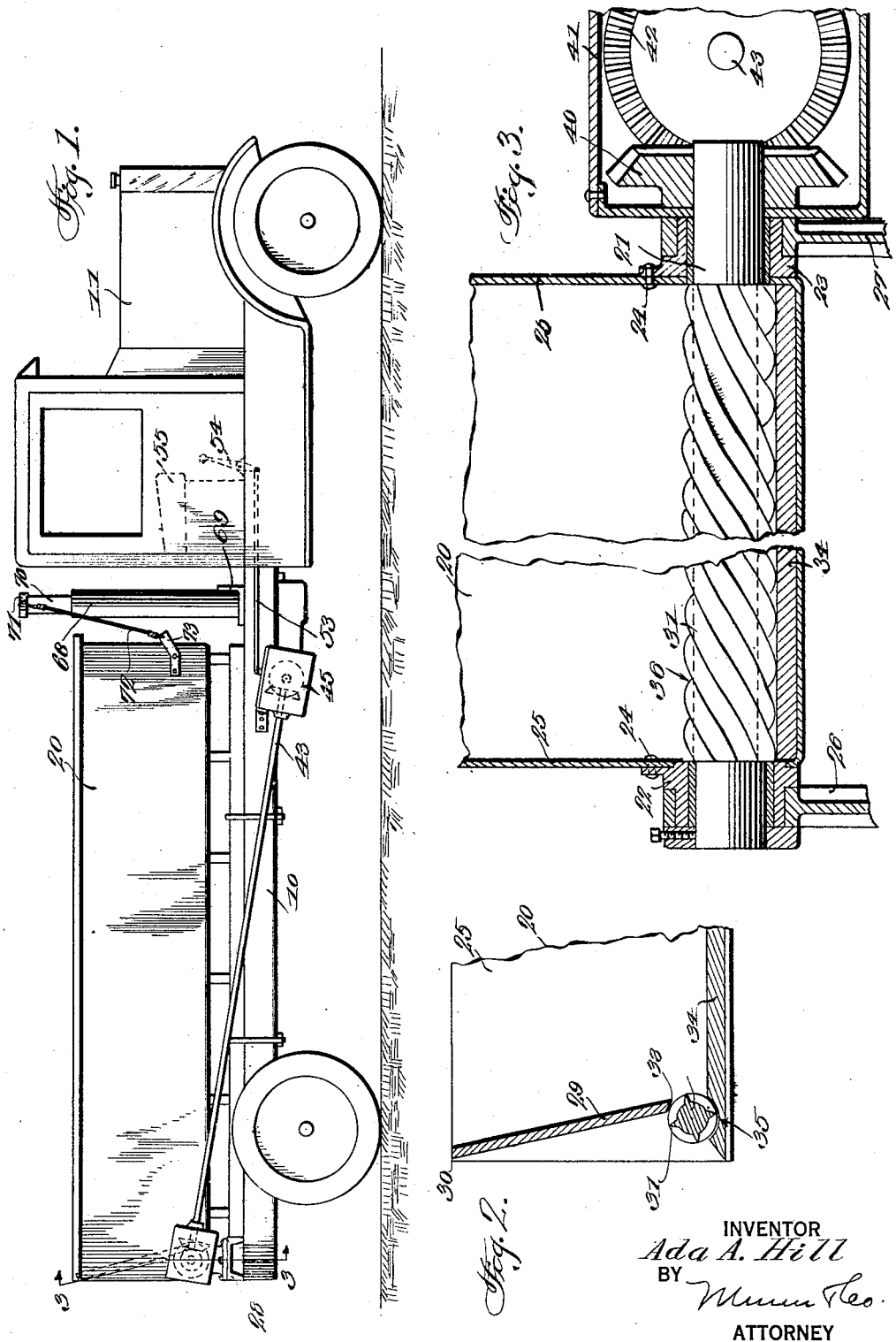

1,829,652

UNITED STATES PATENT OFFICE

ADA A. HILL, OF CLEVELAND, OHIO

ATTACHMENT FOR TRUCKS

Application filed December 1, 1930. Serial No. 499,388.

This invention relates to an attachment for a truck for distributing cinders, salt, sand, or other substances over the surfaces of slippery highways, the device being particularly useful for distributing such materials at intersections, sharp curves, and steep inclines in order to enable motor traffic to travel more safely.

An object of the invention is the provision of a dump truck having a rotatable member fitted into an open space between the bottom and the rear end of the body of the truck, the rotatable member being provided with spirally arranged ribs or raised portions which will evenly and progressively distribute the materials carried by the body of the truck over the roadbed.

A further object of the invention is the provision of a cylindrical member provided with spirally arranged ribs and spaces between said ribs for progessively and positively forcing materials from the truck body outwardly from the rear end for distributing materials evenly over the roadbed and at a thickness which may be determined at will, the materials being delivered at an angle across the longitudinal axis of the roadway.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:—

Figure 1 is a side view in elevation of a dump truck constructed in accordance with the principles of my invention, Figure 2 is a fragmentary vertical section taken along the line 2—2 of Figure 5, Figure 3 is a vertical section taken along the line 3—3 of Figure 1, Figure 4 is a fragmentary plan view of the truck shown in Figure 1, and Figure 5 is a rear end view of the truck.

Referring more particularly to the drawings, 10 generally designates a truck body which is driven by a power plant (not shown) but which is normally located beneath the hood 11 of the truck. The shaft 12 extends from the power plant and is driven thereby. The usual transmission 13 is located between the shaft 12 and the vehicle driving shaft 14.

A truck body 20 is mounted upon the truck 10 and is pivotally mounted on a shaft 21 carried by bearings 22 and 23 secured at 24 to the side walls 25 of the dump body. Standards 26 and 27, respectively, support the bearings 22 and 23 and are secured to a U-beam 28 secured to the chassis or truck 10. A tailgate or closure 29 for the rear end of the dump body 20 is located at an angle to the vertical so that the lower end of the gate which is adjacent spirals 31 formed on the shaft 21 will be located inwardly of the rear end of the body.

It will be noted that that portion of the shaft 21 which contains the spirally arranged ribs or projections 31 is disposed in the space at the rear of the dump body 20 which is defined by the lower end 33 of the tailgate 29 and a floor 34 of the dump body. The floor where the shaft extends across the dump body is cut out along the curve which conforms to the curvature of the spirally arranged member 31 and said member is located within the cutout portion 35 in order to normally maintain the dump body closed at this point. The spirals 31 are so spaced as to provide grooves 36 through which the materials carried in the dump body 20 are forced during the rotation of the shaft 21.

A gear 40 is mounted in a casing 41 at one end of the shaft 21 and is secured to said shaft and driven by a gear 42 secured to a shaft 43. This shaft extends longitudinally of the dump body and has one end projecting into a housing 45 and a gear 46 is secured to the end of the shaft 43 and is located within the housing 45. A gear 47 is secured to a shaft 48 and is also located within the housing 45 and meshes with the gear 46.

A speed transmission 50 is connected between the shaft 48 and a shaft 51 which extends into a clutch housing 52. This transmission is controlled by a link 53 and a lever 54 located adjacent the driver's seat 55 so that the lever may be readily grasped by the hand of the operator for controlling the transmission mechanism 50. This transmission mechanism is not shown but may be of any of the well known types for varying the speed of the shaft 48.

A link 56 is connected at one end with the clutch mechanism located in the housing 52 and is controlled by a lever 57 located adjacent the driver's seat 55. The lever 57 controls the engagement or disengagement of the clutch mechanism for placing the shaft 51 in or out of engagement with the regular transmission mechanism included within the housing 13.

A link 60 is connected at one end with a lever 61 and at its other end with a hand operated lever 62 adjacent the driver's seat. The lever 61 controls a shaft 63 which in turn controls a clutch mechanism located within a housing 64. A drive shaft 65 extends from the clutch housing 64 and is connected with a pump 66 which supplies air by means of a pipe 67 to a cylinder 68 secured to the chassis 10, as shown at 69 in Figure 1.

A plunger 70 is slidably mounted in the cylinder 68 and has a transverse bar 71 secured thereto. A cable 72 connects the ends of the transverse bar 71 with lugs 73 which is secured to the opposite side walls of the dump body and at the front end of said body.

The operation of my device is as follows: The dump body 20 is filled with cinders, salt, sand, or any other material which may be necessary for the particular purpose and the levers 54, 57 and 62 are so positioned that the parts which they control are in an inoperative position until the truck has reached the point on the roadbed where it is desired to distribute the materials. It will be appreciated that the close association of that portion of the shaft 21 which is represented by the numeral 31 with the lower end of the tailgate 29 and the floor 34 will prevent the loss of materials from the rear end of the body.

In order to distribute the materials it is necessary to operate the lever 62 to control the clutch mechanism of the housing 64 so that the pump 66 will be operated, causing the pump to supply the cylinder 68 with sufficient air pressure or fluid to elevate the plunger 70 and thereby raise the front end of the dump body 20. The lever 57 is then moved to an operative position so that the clutch in the housing 52 will connect the transmission mechanism with the shaft 51 and cause rotation of the shaft 48. The lever 54 is then operated if necessary and the truck is moved under its own power along the roadbed. Since the shaft 48 is rotating shafts 43 and 21 will be revolved, causing the spirals 31 to be moved in such a direction that the materials within the dump body 30 will be forced through the space between the lower end of the tail-gate 29 and the floor 34. Due to the fact that the ribs 31 are slightly raised, the material will be forced outwardly in the direction indicated by the numeral 80 in Figure 4, so that the material will be forced at an angle to the longitudinal side edges of the roadway and across the roadway. The thickness of the materials deposited on the roadway will depend upon the speed of the truck and more particularly upon the speed of the shafts 48, 43 and 21 and the speeds of these shafts are controlled by the transmission mechanism located in the housing 50.

It will be seen by this construction that the materials are deposited in an even manner and are positively distributed across the roadway.

I claim:

1. In a truck, a shaft mounted on the rear end of the truck, a dump body pivotally mounted on the shaft and adapted to carry materials for distribution over a roadbed, the shaft intermediate the ends being provided with spirally arranged ribs and intermediately disposed grooves, a tail-gate having the lower end spaced from the bottom of the body, the spirally-ribbed portion of the shaft being fitted neatly within the space, and means for rotating the shaft.

2. In a motor driven truck, a rotatable member having spaced spirally arranged ribs and mounted on the truck, a dump body pivotally mounted on the rotatable member and having a discharge opening at the rear thereof, the body adapted to carry materials for distribution, the rotatable member fitting said opening, a power plant carried by the truck, and means for operatively connecting the power plant with the shaft to cause rotation of said shaft.

3. In a motor driven truck, a rotatable member having spaced spirally arranged ribs and mounted on the truck, a dump body pivotally mounted on the rotatable member and having a discharge opening at the rear thereof, the body adapted to carry materials for distribution, the rotatable member fitting said opening, a power plant carried by the truck, means for operatively connecting the power plant with the shaft to cause rotation of said shaft, and means interpolated in the operating connections between the shaft and power plant for controlling the speed of the shaft.

4. In a motor driven truck, a rotatable member having spaced spirally arranged ribs and mounted on the truck, a dump body pivotally mounted on the rotatable member and having a discharge opening at the rear thereof, the body adapted to carry materials for distribution, the rotatable member fitting said opening, a power plant carried by the truck, means for operatively connecting the power plant with the shaft to cause rotation of said shaft, and means operatively connected between the power plant and the front end of the dump body for causing elevation of said end of the body.

5. In a truck, a shaft mounted on the rear end of the truck, a dump body pivotally mounted on the shaft and adapted to carry materials for distribution over a roadbed, the shaft intermediate the ends being provided with means for forcing the materials in the dump body to be discharged from said body and causing the materials to be distributed across a roadbed and at an acute angle to the longitudinal side edges of the roadbed, a tail-gate having the lower end spaced from the bottom of the body, the distributing means of the shaft being fitted neatly within the space, and means for rotating the shaft.

6. In a motor driven truck, a rotatable member having means for forcing the materials in the dump body to be discharged from said body and causing the materials to be distributed across a roadbed and at an acute angle to the longitudinal side edges of the roadbed, a dump body pivotally mounted on the rotatable member and having a discharge opening at the rear thereof, the body adapted to carry materials for distribution, the rotatable member fitting said opening, a power plant carried by the truck, and means for operatively connecting the power plant with the shaft to cause rotation of the shaft.

ADA A. HILL.